(12) United States Patent
Watson et al.

(10) Patent No.: US 10,320,819 B2
(45) Date of Patent: Jun. 11, 2019

(54) INTELLIGENT SECURITY MANAGEMENT

(71) Applicant: Amazon Technologies, Inc., Reno, NV (US)

(72) Inventors: Alexander Watson, Seattle, WA (US); Daniel Brim, Seattle, WA (US); Christopher Simmons, Burnaby (CA); Paul Radulovic, Seattle, WA (US); Tyler Stuart Bray, San Diego, CA (US); Jennifer Anne Brinkley, Portland, OR (US); Eric Johnson, Seattle, WA (US); Victor Chin, Bellevue, WA (US); Jack Rasgaitis, San Diego, CA (US); Nai Qin Cai, Seattle, WA (US); Michael Gough, Seattle, WA (US); Max Anger, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 15/443,801

(22) Filed: Feb. 27, 2017

(65) Prior Publication Data

US 2018/0248895 A1 Aug. 30, 2018

(51) Int. Cl.
*H04L 29/06* (2006.01)
*G06F 16/951* (2019.01)
(Continued)

(52) U.S. Cl.
CPC .......... *H04L 63/1416* (2013.01); *G06F 16/35* (2019.01); *G06F 16/951* (2019.01);
(Continued)

(58) Field of Classification Search
CPC ............. H04L 63/1416; H04L 63/1433; H04L 63/101; G06F 17/30705; G06F 17/30864;
(Continued)

(56) References Cited

U.S. PATENT DOCUMENTS

| 7,721,336 B1 * | 5/2010 | Adjaoute | G06Q 20/04 379/145 |
| 8,682,764 B2 * | 3/2014 | Love | G06Q 10/10 705/35 |

(Continued)

FOREIGN PATENT DOCUMENTS

WO 2018/156359 8/2018

OTHER PUBLICATIONS

Watson, Alex: :"harvest.ai Blog—harvest.ai", Jan. 26, 2017, XP055472464, URL: https://web.archive.org/web/20170126095820/http://www.harvest.ai-blog.

(Continued)

*Primary Examiner* — Hosuk Song
(74) *Attorney, Agent, or Firm* — Hogan Lovells US, LLP

(57) ABSTRACT

A corpus of documents (and other data objects) stored for an entity can be analyzed to determine one or more topics for each document. Elements of the documents can be analyzed to also assign a risk score. The types of topics and security elements, and the associated risk scores, can be learned and adapted over time using, for example, a topic model and random forest regressor. Activity with respect to the documents is monitored, and expected behavior for a user determined using a trained recurrent neural network. Ongoing user activity is processed to determine whether the activity excessively deviates from the expected user activity. The activity can also be compared against the activity of user peers to determine whether the activity is also anomalous among the user peer group. For anomalous activity, risk scores of the accessed documents can be analyzed to determine whether to generate an alert.

19 Claims, 8 Drawing Sheets

(51) Int. Cl.
  G06N 3/04    (2006.01)
  G06N 3/08    (2006.01)
  G06F 21/55   (2013.01)
  G06N 5/00    (2006.01)
  G06N 5/04    (2006.01)
  G06N 7/00    (2006.01)
  G06Q 20/40   (2012.01)
  G06F 16/35   (2019.01)

(52) U.S. Cl.
  CPC ......... *G06F 21/554* (2013.01); *G06N 3/0445* (2013.01); *G06N 3/08* (2013.01); *G06N 5/003* (2013.01); *G06N 5/045* (2013.01); *G06N 7/005* (2013.01); *G06Q 20/4016* (2013.01); *H04L 63/083* (2013.01); *H04L 63/0861* (2013.01); *H04L 63/101* (2013.01)

(58) Field of Classification Search
  CPC ........ G06F 21/554; G06N 3/08; G06N 5/003; G06N 7/005; G06Q 20/4016
  USPC ............................................. 726/2–4, 22–27
  See application file for complete search history.

(56) References Cited

U.S. PATENT DOCUMENTS

| | | | |
|---|---|---|---|
| 9,892,465 B2* | 2/2018 | Love | G06Q 10/10 |
| 2016/0104163 A1 | 4/2016 | Aquino et al. | |
| 2016/0127367 A1 | 5/2016 | Jevans | |
| 2017/0046519 A1* | 2/2017 | Cam | G06F 21/577 |
| 2018/0248902 A1* | 8/2018 | D Nil-Dumitrescu et al. | G06N 3/02 |

OTHER PUBLICATIONS

Tabish Rashid et al., "A New Take on Detecting Insider Threats", Managing Insider Security Threats, ACM, 2 Penn Plaza, Suite 701, New York, NY 10121-0701 USA, Oct. 28, 2016, pp. 47-56, XP058300331, DOI: 10.1145/2995959.2995964, ISBN: 978-1-4503-4571-2 (abstract, section 5.2 Future Research; p. 55).

Alzhrani Khudran et al., "Automated Big Security Text Pruning and Classification", 2016 IEEE International Conference on Big Data (Big Data), IEEE, Dec. 5, 2016, pp. 3629-3637, XP033056794, DOI: 10.1109/BIGDATA.2016.7841028 (Abstract Section I. Introduction and Motivation; p. 3629-p. 3630; Section II. Background, p. 3631).

International Search Report and Written Opinion issued in PCT Application No. PCT/US2018/017420 completed on May 14, 2018.

* cited by examiner

INTELLIGENT SECURITY MANAGEMENT

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. For various organizations, there can be a very large corpus of data and documents stored for those organizations. It can be very difficult to determine the context of each of these documents, particularly when users create and store the documents to remote data stores without first going through some type of manual classification process. Further, it can be difficult to ensure the appropriate security of these documents because it is difficult to learn the type of access that should be permitted for each of these documents, as well as detecting access that may be inconsistent with the desired permissions.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for data loss prevention for a corpus of documents, and other data objects, stored for an entity. The corpus can be analyzed to determine one or more topics for each of those documents. The analysis can also involve detecting elements or aspects that can be used to assign a risk score to each of the documents. The types of topics and security elements, and the associated risk scores, can be learned and adapted over time using, for example, a topic model and random forest regressor. Access to the various documents can be monitored, and expected behavior for a user determined using, for example, a trained recurrent neural network or other neural network classifier. The actual user activity can be monitored and processed to determine whether any activity is anomalous with respect to, or excessively deviates from, the expected user activity. The activity can also be compared against the activity of user peers, which can also be learned over time, to determine whether the activity is also anomalous among the user peer group. For anomalous behavior, the risk score(s) of the accessed document(s) can be analyzed to determine whether to generate an alert for the access. In order to limit the number of security alerts generated, anomalous access to documents with lower risk scores may be logged, or even ignored, if the risk score is low enough. Each activity and result can be used to train and update the models in order to improve the accuracy of the topic assignments, risk score determinations, and activity classifiers, among other such aspects.

Various other functions can be implemented within the various embodiments as well as discussed and suggested elsewhere herein.

Figure 1:
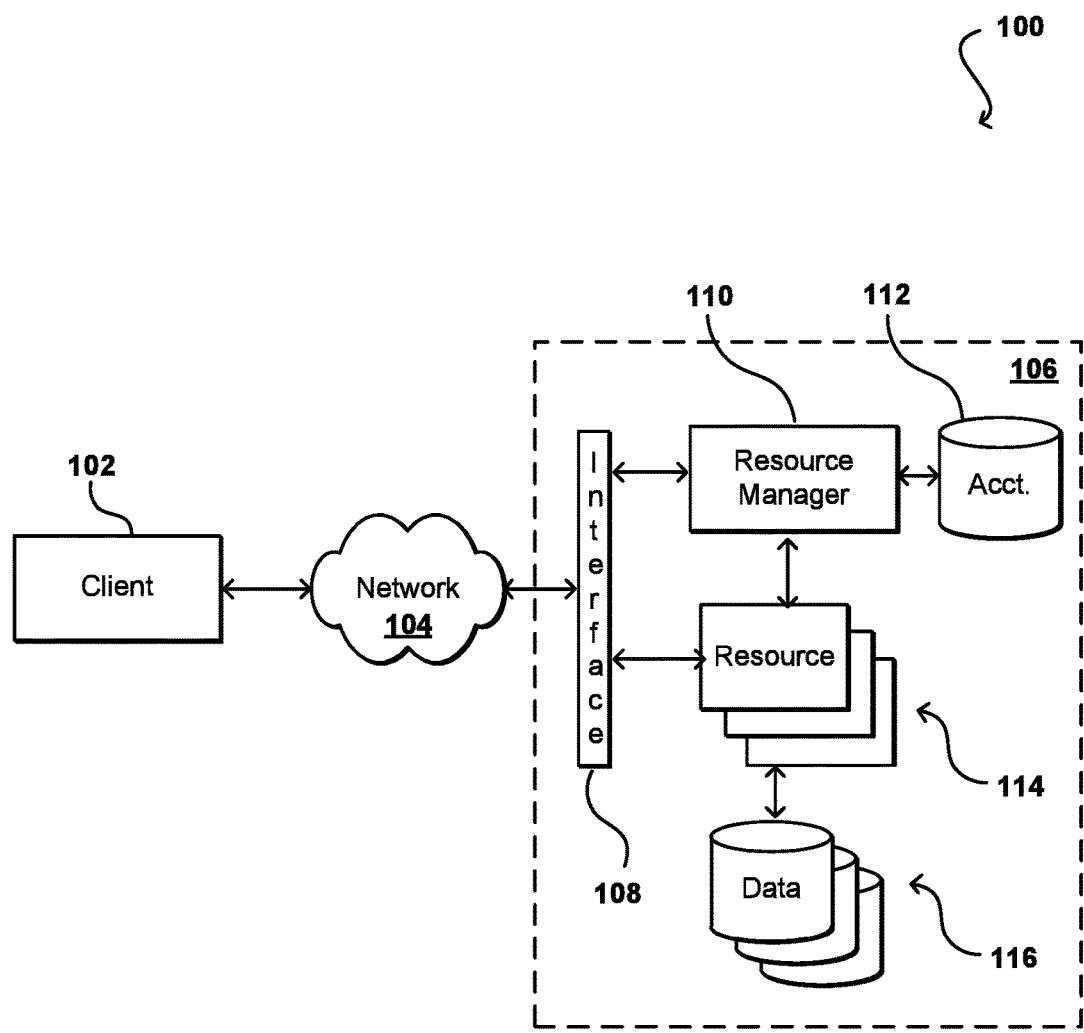
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

For large organizations, there might be millions of documents and data objects (or more) stored across such an environment. It can be difficult for such an organization to manage the documents, such as to determine the contents of the various documents and objects, particularly as they are updated, as well as the access, permissions, or security policies that should be applied for each of the documents and objects. Further, it can be very difficult to determine the appropriate user behavior with respect to these documents, in order to determine when anomalous behavior occurs that could be potentially risky or harmful to the organization. While there are various conventional security mechanisms that can be utilized, such as to search for specific keywords or patterns (e.g., social security numbers, credit card numbers, or medical records), the mechanisms are limited and prone to false positives and failures.

Accordingly, approaches in accordance with various embodiments can attempt to automatically analyze the various documents, data objects, and other such objects (hereinafter frequently referred to for simplicity as just "documents") stored for a customer, or other such entity, to determine one or more topics for each of those documents. The analysis can also involve detecting security elements that can be used to assign a risk score to each of the documents. The types of topics and security elements, and the associated risk scores, can be learned and adapted over time using, for example, a neural network, set of models, trained regressor, or other such mechanism. Access to the various documents can also be monitored, and predicted or expected behavior for a user determined using, for example, a recurrent neural network. The actual user activity can be monitored and processed to determine whether the activity is anomalous with respect to the expected user activity. The activity can also be compared against the activity of user peers, which can also be learned over time, to determine whether the activity is also anomalous among the user peer group. For anomalous behavior, the risk score(s) of the accessed document(s) can be analyzed to determine whether to generate an alert for the access. In order to limit the number of security alerts generated, anomalous access to documents with lower risk scores may be logged or even ignored if the risk score is low enough. Each activity and result can be used to train and update the models in order to improve the accuracy of the topic assignments, risk score determinations, and activity classifiers, among other such aspects.

Embodiments in accordance with the various embodiments can provide a data loss prevention service that can help protect against the compromise and theft of documents, data, and other intellectual property. Customers having accounts with such a service provider, who in at least some embodiments is also the resource provider providing the multi-tenant resource environment, can utilize various tools and interfaces to obtain information about their stored documents, and can receive reports or alerts for anomalous or risky behavior detected with respect to their documents. This can help to protect the documents stored in such a multi-tenant environment, or resource provider environment, often referred to as storage in "the cloud."

In some embodiments such a service can utilize artificial intelligence (AI) or machine learning to locate and track customer intellectual property, such as email, documents, and spreadsheets, as well as associated data and other objects. In some embodiments this can include documents stored across a customer network as well. Such a service can leverage natural language processing (NLP) to understand information such as the topic, business relevance, and value of each document or piece of data. The service can also determine a risk level or score for each document. The service can identify and surface anomalous behavior or engagement with data, alerting the customer of a potential breach or attack. For example, if a customer service representative attempts to access confidential personnel files from a foreign IP address, the service might identify this activity as anomalous and generate an alert. In at least some embodiments the service can also assign a risk score or security level to each such document, whereby the determination as to whether to generate an alert can be based at least in part to the risk score(s) of the document(s) accessed.

In various embodiments, a data loss prevention system or service can utilize topic modeling. The topic model utilized or generated can be based upon any appropriate technology, such as Latent Dirichlet allocation (LDA), which can find clusters of documents and topics. The topic modeling can take advantage of various generative statistical techniques to allow sets of observations to be explained by unobserved groups, which can help to explain why some parts of the data are determined to be similar. This differs from conventional use as an unsupervised classifier that identifies a set of topics across a large corpus of data, being used instead to classify the kinds of data that a user typically accesses, individually and with respect to the user's peers. Such an approach provides an advantage of not requiring specific knowledge of an organization's data, but can instead create and maintain a set of topics that a given user or peer group typically accesses as a subset of the overall corpus. Similarly, the training documents with assigned risk scores can be used to train a classifier, such as a random forest regressor, in order to be able to determine risk scores for subsequently processed documents. The trained regressor can receive a document including a labeled set of data and provide a corresponding risk score as discussed elsewhere herein.

Such data loss prevention service can utilize the quantities, frequencies, or other such metric(s) of documents accessed over a given period of time as an input to a recurrent neural network trained on the user, as well as the user's peers in at least some embodiments. In at least some embodiments a peer group can be determined automatically based upon an organizational structure (i.e., organizational chart) and/or learned by analyzing information such as the type of documents or topics accessed, frequencies of those accesses, and the like. Examples of peer groups can include, for example, groups of software developers or human resources personnel, who are likely to access the resources in specific ways. The activity of the peers, and others with whom a user frequency interacts, can help to predict information such as the types of topics and the quantity of documents with which a user will interact, in order to determine suspicious accesses for which an alert should be generated.

In one embodiment, the documents that a user accesses during a work day can be tracked, monitored, or otherwise determined. A topic model is trained and updated based on the processing of the entire organization's corpus of data. Each document across an organization can be labeled as consisting of one or more topics. Users can be clustered into peer groups based at least in part upon the types of data with which they interact, as well as organizational structure or other such information. As users interact with various documents, the count of documents and topics being accessed are fed as input to an unsupervised classifier with back propagation that can predict future activity based on a historical baseline. When a user deviates more than a determined amount (i.e., more than a threshold or maximum allowed amount) from the types or frequency of access predicted, as well as that of a peer group in at least some embodiments, the neural network can detect the deviation and generate an alert for a security group or other appropriate entity.

In some embodiments a recurrent neural network (RNN) can be used to model user behavior and alert on increases or decreases in baselined activity that indicate risk for an organization. Such RNN-based approaches (or other approaches such as hierarchical temporal memory-based approaches) can provide benefits such as simultaneously evaluating hundreds of features of user activity or more, individually and with respect to one or more user peer groups. In various situations, however, conventional neural networks do not provide users with significant insight (introspection to the models) or the ability to easily tune output of the results to achieve better performance for specific use cases. Accordingly, approaches in accordance with various embodiments provide the ability to visualize the individual inputs being evaluated together by the RNN, as well as the ability to smooth the outputs to make the neural network more or less responsive to changes in its input over time. In at least some embodiments the smoothing can be achieved through the use of a Kalman filter-based smoothing function that can be applied to the individual feature predictions coming from the neural network, before those predictions are evaluated by the higher level classifier that determines whether the functions are anomalous. Such an approach provides the ability to adjust the weightings, as well as the response of per-feature combinations going into the neural network for predicting user activity. This can help to dramatically increase performance for precision and recall, as well as to identify and reduce the impact of noisy features or corner cases that can otherwise impact performance.

Figure 2:
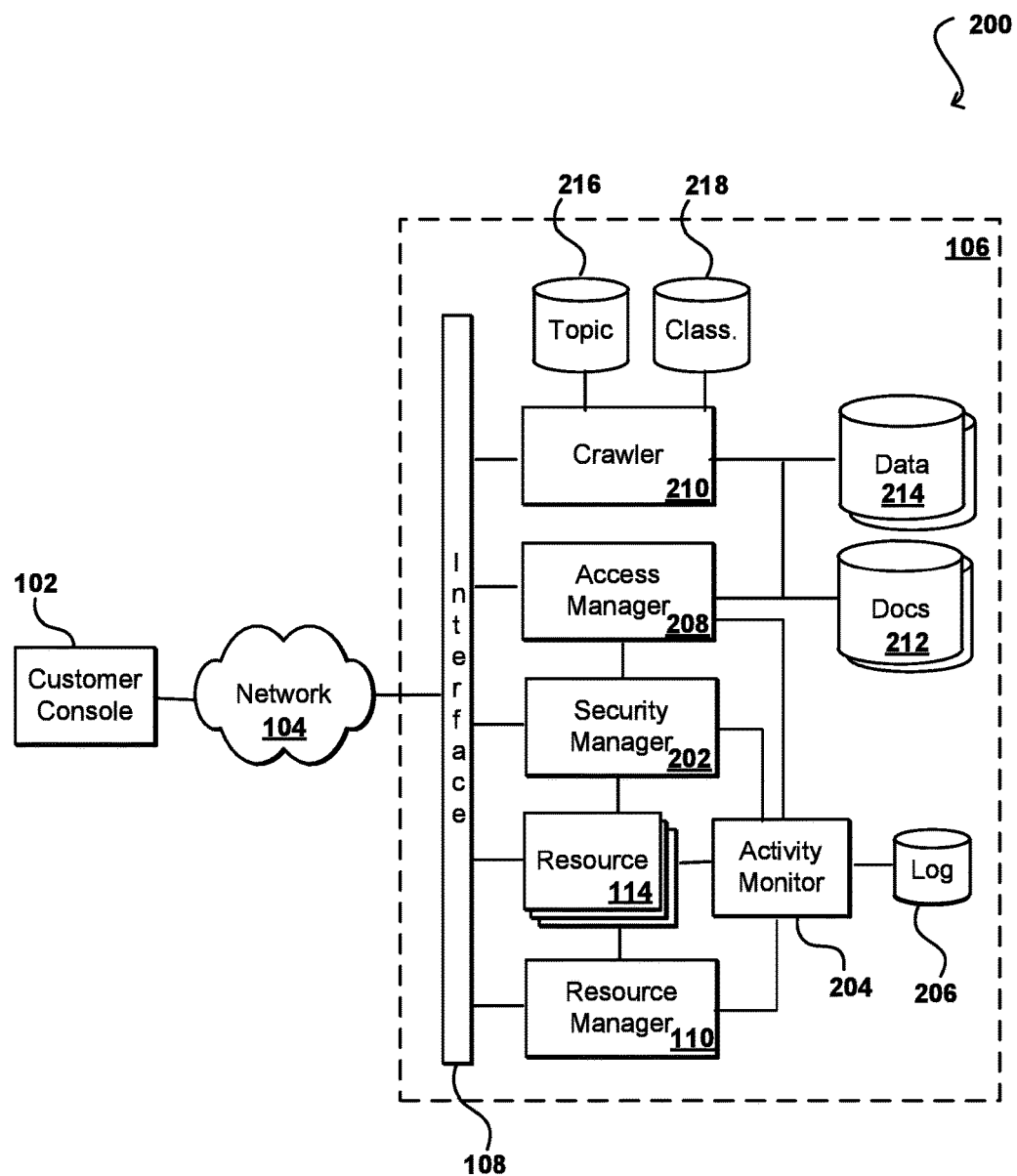
FIG. 2 illustrates an example system that can be used to analyze documents and data stored for one or more customers that can be utilized in accordance with various embodiments.

FIG. 2 illustrates an example system 200 that can be utilized to perform functions such as crawling and document analysis in accordance with various embodiments. Reference numbers may be carried over between figures to represent similar objects for simplicity of explanation, but such usage should not be interpreted as a limitation on the scope of the various embodiments unless otherwise specifically stated. As with the environment of FIG. 1, a customer can utilize a client device, here operating a customer console 102, to access resources of a resource provider environment 106 across at least one network 104. As mentioned, this can be used to store customer data, such as to at least one data repository 214, and documents to at least one document store 212, among other such options. The customer in some embodiments can utilize the customer console 102 to specify security settings that can be utilized by an access manager 208, or other such system or service, to control access to various data and documents stored for the customer. As discussed in more detail elsewhere herein, various security policies can be implemented to require specific permissions, credentials, roles, or other access criteria be satisfied before a user is able to access certain data or documents. A service such as an activity monitor 204 can monitor the access of the various documents and data by various users, and store the information to a location such as an activity log 206 or other such repository. A security manager 202 can work with the access manager 208 and/or activity monitor 204 to determine the presence of potentially suspicious behavior, which can then be reported to the customer console 102 or otherwise provided as an alert or notification. In at least some embodiments the customer console 102 can also be used to provide security settings or selections to the security manager 202 to determine the types of alerts to be generated, types of behavior for which to generate alerts, and other such information.

In at least some embodiments there can be any arbitrary content stored to the data stores 214 and/or document stores 212 on behalf of a customer, such as an organization. In at least some embodiments it can be desirable to analyze this content to provide visibility into the types of data, documents, and other objects stored on behalf of the customer. In this example a crawler 210 can be used to locate and analyze the various documents (and other data, etc.) stored on behalf of a customer. The crawler can include various data crawling algorithms for purposes of locating, parsing, and evaluating contents of the data, such as to analyze words, numbers, strings, or patterns contained therein. The crawler 210 can also include, or work with, a classifier algorithm that can classify the various documents, such as to assign one or more topics to each document. The crawler 210 can also include, or work with, one or more risk assessment algorithms that can determine a risk score for each (or at least a subset of) the documents. In at least some embodiments the risk score can be a composite of various metrics for regular expressions, which can be based at least in part upon the presence of various topics and themes in the documents. One advantage to such an approach is that a customer can utilize the customer console 102 or another such mechanism to gain visibility into the type of content that is stored for the customer, as well as the risk associated with that content. In at least some embodiments the customer can also have the ability to view the content, as well as the assigned topics and risk scores, and make adjustments that the customer deems appropriate. These adjustments can then be used to further train the neural network in order to improve future classifications and score determinations. In at least some embodiments, the customer can also view patterns or types of access to the various documents, lists of users or peer groups who access specific documents or topics, documents with specific risk scores, and the like.

In one embodiment, the crawler 210 classifies all content using a combination of known documents and unsupervised classifying. An initial set of classified documents can be provided as an initial training set. These documents can have assigned risk scores as well, or initial risk criteria can be provided for training, among other such options. The initial data can be used to train the neural network, and then the corpus of data can be used to provide for unsupervised classifying. Such an approach can enable industry-specific content to be recognized and classified, and appropriate risk scores determined. Conventional approaches to classifying documents may look for specific content, such as social security numbers or credit card numbers, and can alert anytime a user accesses that information. Approaches in accordance with various embodiments instead provide the ability to dynamically classify content that has not previously been encountered or classified, which can include industry-specific content data, such as pharmaceutical data and the like. The topics can be determined and risk scores assigned based on what is learned about the content as well as how other related content is scored. For example, the scores of documents accessed by peers with similar frequency can be used to estimate risk scores for these documents as well. The classifier can attempt to isolate and label specific content, and then determine an appropriate risk score to assign. In at least some embodiments various behavioral analytics can be utilized to determine baseline user activity with respect to a document, which can be used to determine risk score. Various embodiments can also isolate features of the documents that indicate risk for a business, such as by recognizing pharmaceutical documents as being something that is accessible to only a small quantity of people within a business. This can help to learn types of data and associated topics for use in generating risk scores and access patterns, etc.

In one example, a crawler 210 can index all documents (and other data) associated with a customer. The crawler 210 can also analyze the content of the documents, as well as the historical access patterns for those documents. The historical access patterns can include information relating to opens, reads, updates, logins, administrative events, and the like. In some embodiments all access data determined over a period of time, such as the previous six months, can be utilized to build a topic model that can be used to classify documents and/or perform other such classifications. In this example the crawler utilizes topic modeling, which provides insight as to how to classify various instances of text content. Topic data can be stored to a topic data store 216 in some embodiments, while the classification data for various documents can be stored to the documents themselves, or stored to a classification data store 218 or table that references the documents, such that the classification can be readily determined.

Figure 3:
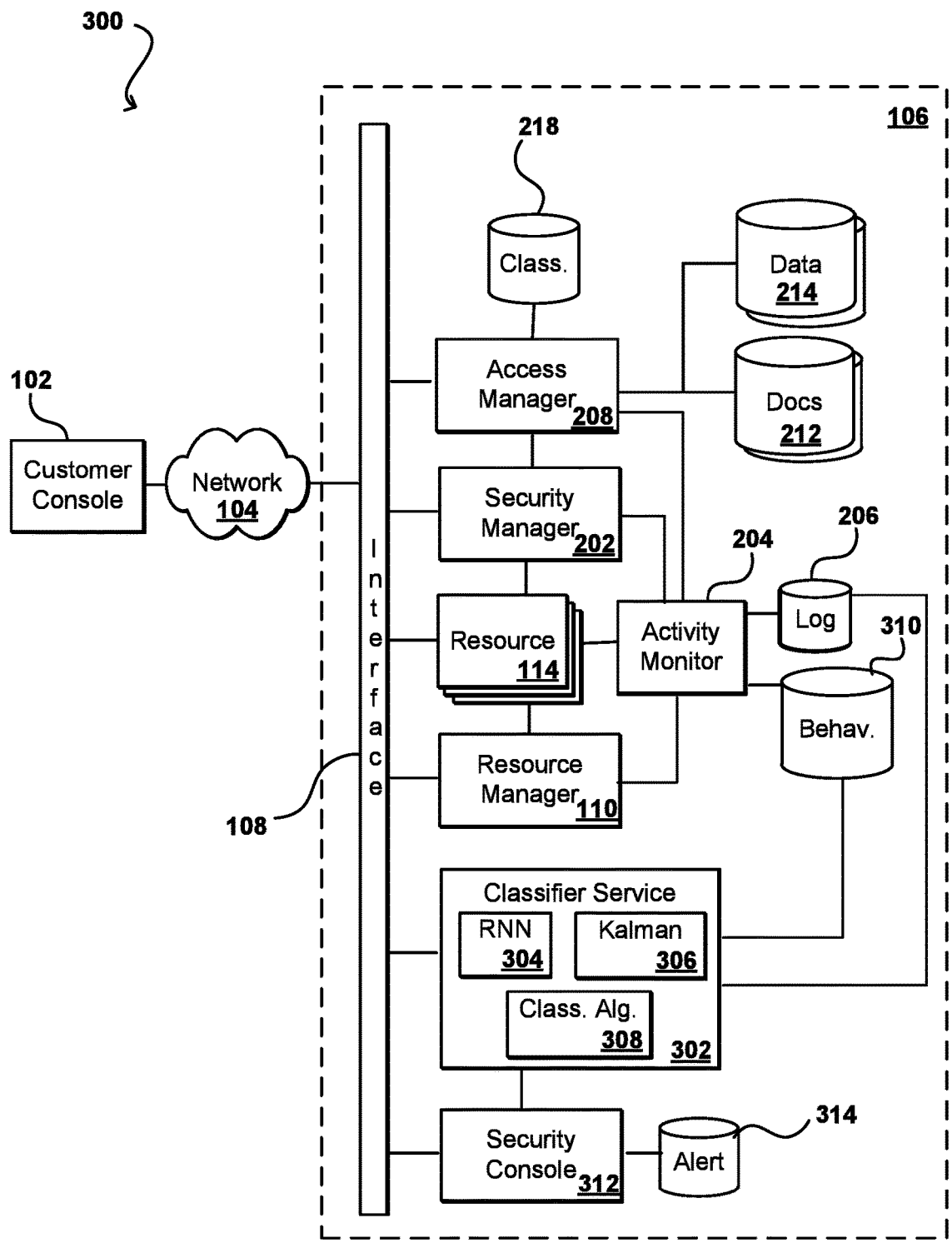
FIG. 3 illustrates an example system that can be used to detect anomalous behavior with respect to customer documents that can be utilized in accordance with various embodiments.

FIG. 3 illustrates an example system 300 that can be used to determine anomalous behavior for classified documents in accordance with various embodiments. As with the previous example, this system can include an activity monitor 204 that can monitor the accessing of various documents, data, and other objects by users of the system. The information can be stored to a location such as a log data store 206 or other such location. Information for each activity can be fed to a classifier service 302, or pulled from an activity queue by the classifier service, among other such options. In some embodiments the activity data can be processed individually while in other embodiments the data may be processed in batches, such as in batches of thirty-two activity entries, in order to prevent the training of the neural network from consuming excessive resources, etc. In some embodiments aggregations or summaries of user activity over a period of time can be processed, which can be more cost and resource efficient than using the raw data. For example, all service interactions for a user can be summarized using a technology such as Apache Spark, an open source cluster computing framework.

In this example, the activity data is received to the classifier service and processed by a recurrent neural network (RNN). It should be understood that other types of neural networks (i.e., convolutional or generative adversarial networks) can be used as well within the scope of the various embodiments. The activity data can be processed by the RNN of the classifier service initially to predict the activity of various users over a determined future period of time. This information can be determined by the trained RNN and based upon information such as past behavior of the user and behavior of the user's peers, among other such options. The predicted or expected behavioral data can be stored to a behavior data store 310 or other such location. An advantage of using recurrent neural networks is that the networks can learn to recognize patterns of usage over time over large numbers of users and documents, and predict how a user might act based on those patterns going forward. Recurrent neural networks can also learn normal activity patterns that might otherwise seem suspicious, in order to ensure that false positive alerts are not generated for frequent or infrequent access of certain data. The RNN can be much better at recognizing patterns such that deviations from those patterns can more accurately be flagged as suspicious. RNNs are also able to concurrently analyze large numbers of features such that a set of features for a data source can be combined together for analysis. The RNN can be utilized in an unsupervised capacity so the network can adapt with the data. This helps to adapt to changes in access pattern and identify different types of attacks that might otherwise go undetected.

When subsequent activity is detected, that information can be fed to the classifier service 302 for analysis. The activity data can be processed with the RNN to identify whether any of the activity falls outside the expected behavior in such a way as to be labeled suspicious. In some embodiments there may be various thresholds, values, or ranges for which activity is determined to be suspicious when deviating from expected behavior, while in other embodiments the RNN can be trained to expect variations and only flag these types of activities as suspicious, among other such options. It might be the case, however, that usage over a specific period may appear to be suspicious, but not over a different period of time. For example, a user might typically access a given document ten times an hour, but might not typically access that document ten times in a five minute period. Even though the usage over the five minute period may be suspicious, it is not necessarily suspicious over the longer time period. Accordingly, approaches in accordance with various embodiments can attempt to smooth the results of the RNN, such as by utilizing a Kalman filter or other such algorithm. A Kalman filter is used to generate a linear quadratic estimation based on a series of measurements observed over time that can contain noise and other inaccuracies to generate an estimate that is more accurate that might be based on a single time period alone. The Kalman filter can be used when predicting user behavior as well as determining whether specific activity is suspicious, or unacceptably outside the predicted behavior, among other such options. In one example, a Kalman filter takes a time series of activity for a given user, such as the number of documents downloaded or number of API calls, etc., over multiple periods of time. The results over the different time series can be smoothed with the Kalman filter to, with some minor training, generate more active predictions that would otherwise be generated with the RNN alone. In at least some embodiments the RNN and Kalman filter can be used concurrently, with the RNN generating the individual feature predictions that get smoothed out by the Kalman filter. The smoothed results can then be provided to a trained (high level) classifier algorithm, which can ultimately determine whether the activity is suspicious such that an alarm should be generated or other such action taken.

The predictions can also be made at specific steps or points in time based upon past and expected behavior or the user and the user's peers. The smoothing process can also provide a confidence interval, which helps to determine reasonable deviation from an expected value to further limit false positives. In some embodiments the error between expected and actual activity for a user can be accumulated, and the summary of errors over a time series analyzed to identify users with excessively large error values, which can be indicative of suspicious activity. Alerts can thus be generated for specific suspicious activity or activity that appears suspicious for a user in aggregate, individually or with respect to the peers of that user. In some embodiments the aggregate error score will be compared against the peers of the user, and error scores that deviate from the peer scores by more than a threshold amount may be reported as suspicious, in order to account for unexpected variations that are experienced by a group of peers, and thus less likely to be suspicious activity on behalf of any individual user of that peer group. A security console 312 in some embodiments can be notified of any suspicious activity, in order to provide an alert or at least store information to an alert data store 314 for subsequent analysis, among other such options.

Figure 4:
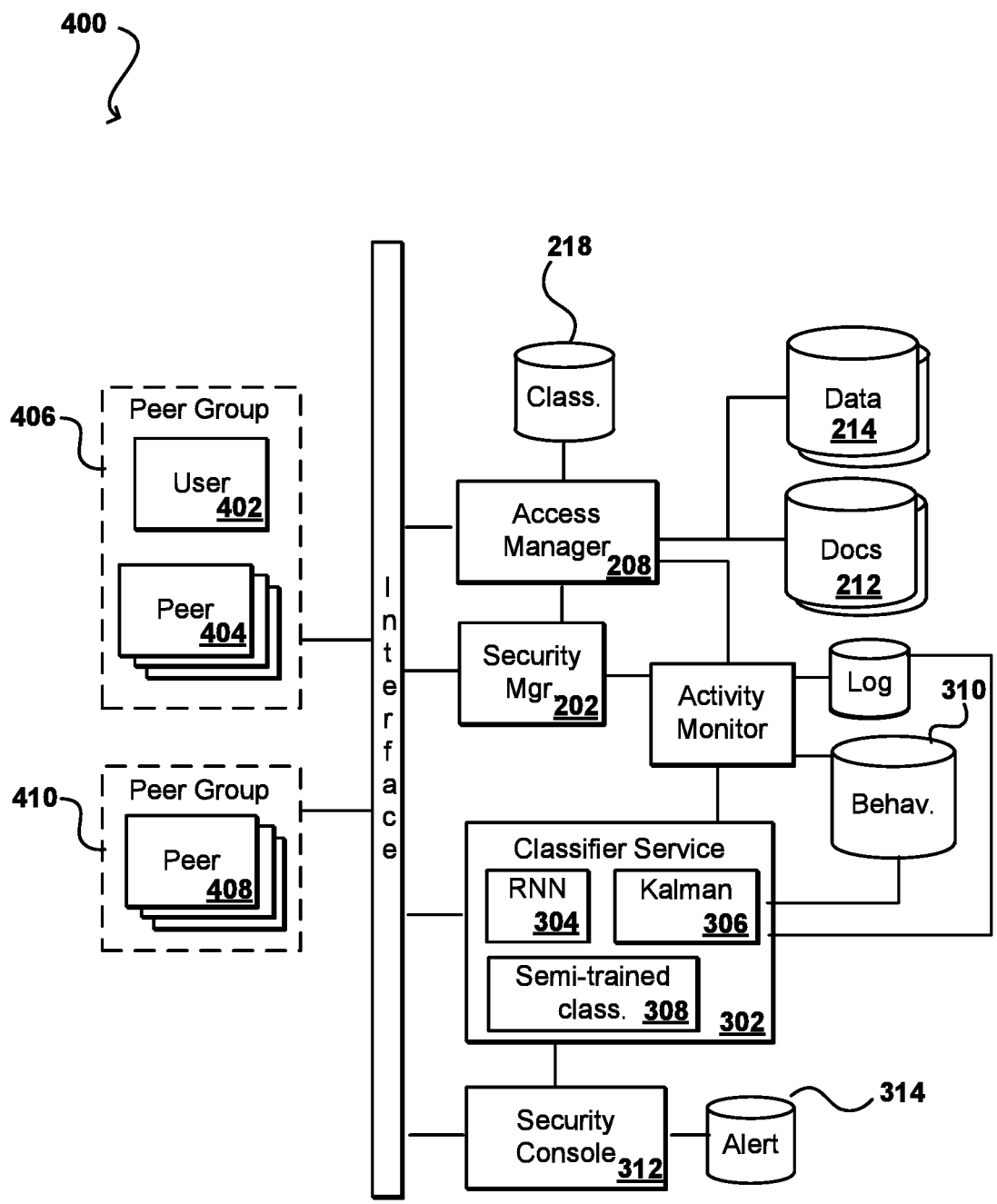
FIG. 4 illustrates an example system that can be used to detect anomalous behavior of a user with respect to determined user peers in accordance with various embodiments.

FIG. 4 illustrates a system 400 including a subset of the components of the system of FIG. 3, which can be used to determine peer groups in accordance with various embodiments. As mentioned, in at least some embodiments a user's activity can be predicted based at least in part upon activity of peers of the user, and suspicious behavior determined with respect to behavior of other users in the peer group. While these peer groups can be determined based upon known information, such as organizational structure, the peers can also be determined over time by learning the types of documents that are accessed, patterns and frequency of that access, and other such information. As an example, a classifier or crawler might be able to identify multiple source code languages and logging formats, such as may include Windows Event data, AWS Cloudtrail, VPC Flow, Apache, and IIS. The classifier or crawler may also be able to identify various database backup formats, such as MySQL, MSSQL, and MongoDB, as well as regulatory forms such as SEC documents and FDA filings.

In some embodiments the mappings and determinations from the organizational structure can be used as initial input into the RNN. An RNN analyzing the activity data for actual usage can also determine users who are peers with respect to the types of behavior exhibited in the system. A user thus might belong to multiple peer groups, or may belong to a specific peer group that is learned over time and outside any specific organizational structure or designation. In some embodiments the peer groups might be weighted, while in others activity that is suspicious for any peer group might generate an alarm while in others activity must be suspicious for all peer groups (absent other factors) before an alarm is generated. As mentioned, a classifier trained on the activity data as part of the classifier service 302 can determine and update peer groups based upon observed behavior over time. The similarity of activity can cause a specific user 402 to be grouped with peers 404 in a first peer group, but not associated with peers 408 of a separate peer group with a substantially different activity pattern of behavior. The number of peer groups can be limited or unlimited, which can impact the precision of the determinations. There may need to be at least a minimum number of users in a group, however, in order to obtain reliably steady access patterns for comparison. Further, large numbers of peer groups can lead to potentially excessive resource usage, particularly where a user might belong to an unlimited number of groups.

The activity patterns evaluated are not limited to the documents accessed and number of accesses, in at least some embodiments, and can also include information such as the path or type of access. For example, read versus write access can be differentiated. Further, calls from specific resources or IP addresses or address ranges can be analyzed as well. In at least some embodiments the RNN can be tuned to account for additional or other aspects of the activity, and in some cases the RNN can be enabled to learn information about the activity that can be indicative of expected types of access or activity. In at least some embodiments the confidence level for each of these features can also be separately adjusted, such that the requirement for a request to come from a specific IP address or geographic region might be allowed to vary more than a type of document that the user typically does not access, etc. This also enables a user to change IP addresses, at least within a given range, without generating an alert, as this activity may be abnormal buy may happen frequently across the user base and could otherwise result in many alarms for false positives. The user can be allowed to adjust the confidence values or thresholds for individual features in order to adjust the number of alerts generated for specific features. Thus, if a user is getting too many alerts of a specific type that are not actually problematic, then the user can adjust the threshold or confidence level such that only more extreme deviations for that particular feature will generate an alarm.

In some embodiments documents can be grouped into buckets, whereby importance and risk values can be assigned to the various buckets. For example, human resources (HR) documents might be grouped into one bucket while medical records might be grouped into another bucket. This grouping can be performed offline and manually, or the groupings can be learned over time, among other such options and combinations. Such an approach can allow a similar risk or importance value to be assigned to all documents in a bucket, even though it may be difficult to determine individually the appropriate risk or importance score for each. In some embodiments the bucket score can be a minimum risk score for each document contained therein, as information with higher scores contained within each document can be used to determine the individual document score. In at least some embodiments the risk score assigned to a document is equal to the highest risk score determined for any element in the document. For example, risk scores might be assigned from 1 (being low risk) to 10 (being very high risk). An HR document in an HR bucket might have a risk score of 5, but if a particular document includes a social security number with a risk score of 8 then that particular document would have a score of 8. And if that document had five social security numbers each with a risk score of 8, the document still in that example would have a risk score of 8. In some embodiments risk scores may aggregate or have weightings such that a document with many social security numbers would have a higher risk score than a document including a single risk score, among other such options. As mentioned, the risk score can be used to determine an action to be taken for suspicious activity. The actions taken for risk scores also can be modified by a customer or adapted over time based upon customer feedback. In some embodiments a random forest regressor can be used that accepts a complex set of features that initially can correspond to the output of the risk analysis algorithm but subsequently can be updated based upon customer feedback and other such information regarding importance.

In addition to setting actions for specific risk scores, a customer can set or adjust various other thresholds or triggers as well. For example, suspicious activity can be determined when a user is accessing a document with a topic that is different than would normally be accessed by that user. A customer can specify the level of difference that should be allowed before an alert or similar action is taken. For example, inter-topic distances can be calculated to generate a relevant difference between two topics, and a customer can specify a minimum difference that must be met before an alarm is generated. A customer can also specify different actions for different ranges. For example, differences less than a first threshold might be ignored, while differences between the first threshold and a second threshold might be logged and alarms generated only for inter-topic differences that exceed the second threshold. In some embodiments natural language understanding (NLU) can be used to determine topics and concepts, or words relevant to those concepts, which can be vectorized into a vector space to assemble the topics and determine their distance in vector space. The vectors and space may be generated using, for example, linear discriminant analysis (LDA) or principal component analysis (PCA), among other such options.

A DLP service in accordance with various embodiments can thus analyze activity of user, application, and service accounts associated with sensitive data that suggests risk to a business, such as inadvertent exposure of data, insider threats, or targeted attacks. Such a service can alert on suspicious activity such as compromised user accounts enumerating and downloading large amounts of sensitive content from unusual IP addresses, or the download of large quantities of source code by a user account that typically does not access this type of sensitive content. A compliance-focused example includes detection of large quantities of high-risk documents shared publicly or to an entire company, such as files containing personally identifiable information, intellectual property, legal, or financial data. Additionally, customers also have the ability to use a customer dashboard to define their own alerts and policy definitions, such as white-listing and blacklisting third party applications that need to access sensitive content.

In some embodiments, one or more topic models can be used to provide for automated content classification and labeling by automatically discovering, classifying, and labeling both existing and new content as the is created and/or stored. This thematic slicing capability can utilize elements from topic modeling including Latent Dirichlet Allocation (LDA), named entity extraction, document similarity, and clustering to infer a human understandable meaning and business value for content that may not match a known document template. As mentioned, document similarity can be utilized to reliably gauge similarity across different file types that might both deal with the same topic. This capability can utilize document vectors coming from LDA topic space, doc2vec, or TF-IDF bag-of-words space. The capability can also utilize features from the document metadata, as may include file type, file owners, information regarding whether the file is shared externally, and a visibility level of the file. These different "types of similarity" can then be combined together, such as by using a weighted average, so that different types have different impact on the ultimate similarity score.

An anomaly detection service or classifier used in accordance with various embodiments can update its state based on information extracted from raw activity event records, and can subsequently answer queries about the "risk level" associated with user and system accounts by examining a variety of independent datasets, as well as generating alerts and narrative explanations of why the alert was created when anomalous and risky activity across these datasets is observed. Anomaly detection algorithms utilized can include Kalman filters and Long Short Term Memory (LSTM) recurrent neural networks (RNNs), which we have proven to be effective at identifying anomalies based on user's temporal access patterns. Further, an "explain" capability can be provided that offers a narrative explanation of the anomaly detected, utilizing statistical techniques to offer insight into traditionally black-box behavior classifications. Such an anomaly detection framework can train itself continually, and can utilize a fitness function to continually refine its own performance by injecting simulated attack scenarios into the input event stream.

Figure 5:
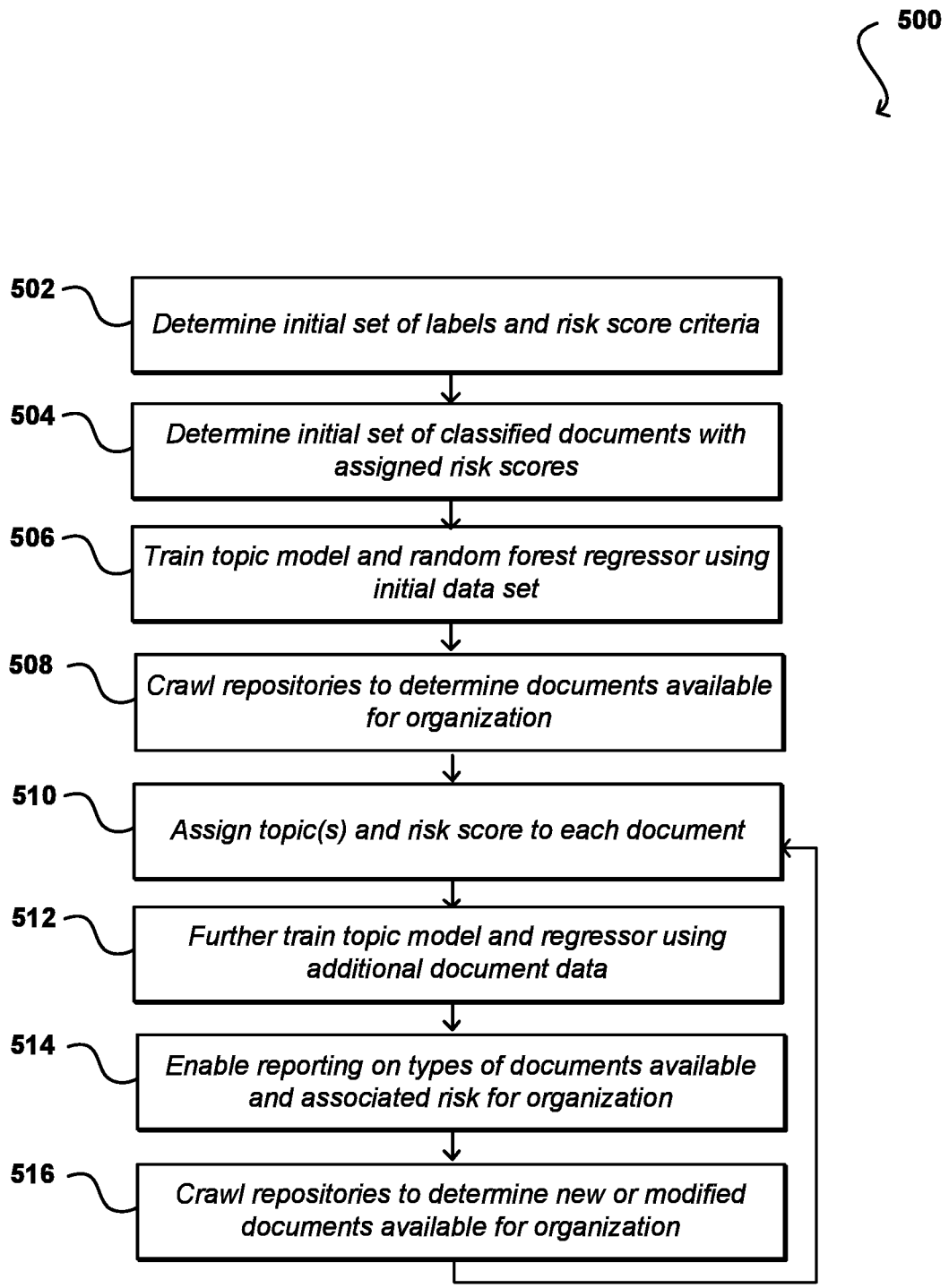
FIG. 5 illustrates an example process for locating and classifying documents that can be utilized in accordance with various embodiments.

FIG. 5 illustrates an example process 400 for processing a registered function for an event using one or more allocated resource instances that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, an initial set of topic labels and risk score criteria is determined 502. These can include, for example, specific topics of interest to a particular customer, as well as risk scores to be assigned for certain elements that may be detected in a particular document, among other such options. An initial set of documents can be determined 504 that are classified according to these topics and have assigned risk scores, to be used as training data The topic model and a random forest regressor for risk scores can be trained 506 using the initial training data. A crawler, or other such system or service, can also crawl 508 various repositories or other storage locations to determine documents that are stored and available for access for an organization, which can be a customer of a data loss prevention service. The crawler, or a service working with the crawler, can assign 510 one or more topics to each document (or data object, etc.), as well as a risk score or other such value. A customer or other authorized entity can have the ability, in some embodiments, to override or update these determinations based at least in part upon knowledge of the intended topics or actual risk of the documents. The topic model and regressor can continue to be further trained 512 using additional document data, such as data for updated or newly stored documents for the organization. The service can enable 514 reporting and other types of visibility into the corpus of documents for an organization, whereby the organization can be able to determine the types of documents available and associated risk, as well as potentially other information such as patterns of access, topics identified, and the like. The service can also continue to crawl 516 (such as at regular intervals) the repositories to determine new or modified documents that are available for the organization, in order to classify and generate scores for those documents, as well as to further train the model to incorporate the most recently available document data.

Figure 6:
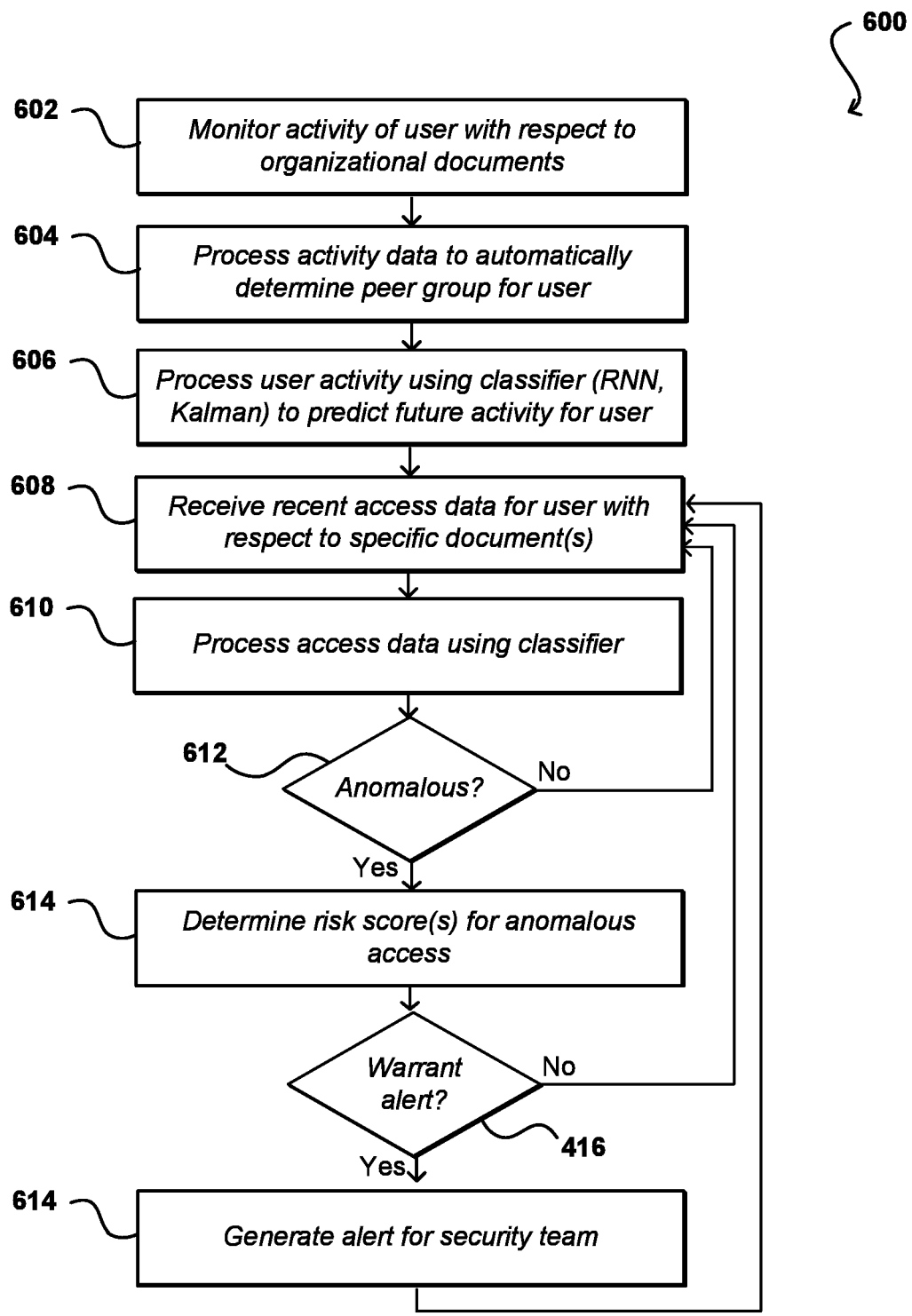
FIG. 6 illustrates an example process for detecting anomalous behavior that can be utilized in accordance with various embodiments.

FIG. 6 illustrates an example process 600 for identifying anomalous activity that can be utilized in accordance with various embodiments. In this example, the activity of a user can be monitored 602 with respect to organizational documents, data, and other such objects. As mentioned, the activity of all users or a subset of users can be monitored, or a subset of that activity, within the scope of the various embodiments. The activity data can be processed 604 using a topic model to determine an appropriate peer group for the user. As mentioned, this can be determined using a trained RNN or classifier service, to determine a peer group exhibiting similar historical and/or predicted access patterns, among other such options. The activity for the user can be processed 606 using a classifier service to predict future activity for the user. As discussed in more detail elsewhere herein, this can include processing the raw or summarized data using a RNN to generate predictions which can then be smoothed using a Kalman filter or other such algorithm. The smoothed results can then be fed to a high level classifier to determine whether or not the activity is suspicious or otherwise should cause an action to be taken, such as to generate a security alert. Recent access or activity data for the user can be received 608 with respect to specific documents stored for the customer or organization. The access or activity data can be processed 610 using the classifier service (including the RNN and Kalman filter) to determine whether anything about the activity is anomalous, at least to more than an acceptable amount of deviation. If it is determined 612 that the activity is not anomalous then the process can continue. If, however, it is determined that the activity is anomalous, then the risk scores for the anomalous access (and other such factors) can be determined 614, which can be compared against various rules, criteria, or thresholds for performing specific actions. If it is determined 616 that the risk scores for the anomalous behavior warrant an alert, such as by the risk score being above a specified threshold, then an alert can be generated for the security team. Various other actions can be taken as well as discussed and suggested elsewhere herein. If the activity does not warrant an alarm then another action may be taken, such as to log event data for the anomalous behavior, and continue monitoring activity. Any activity data can also be fed back into the RNN in order to further train the network.

Figure 7:
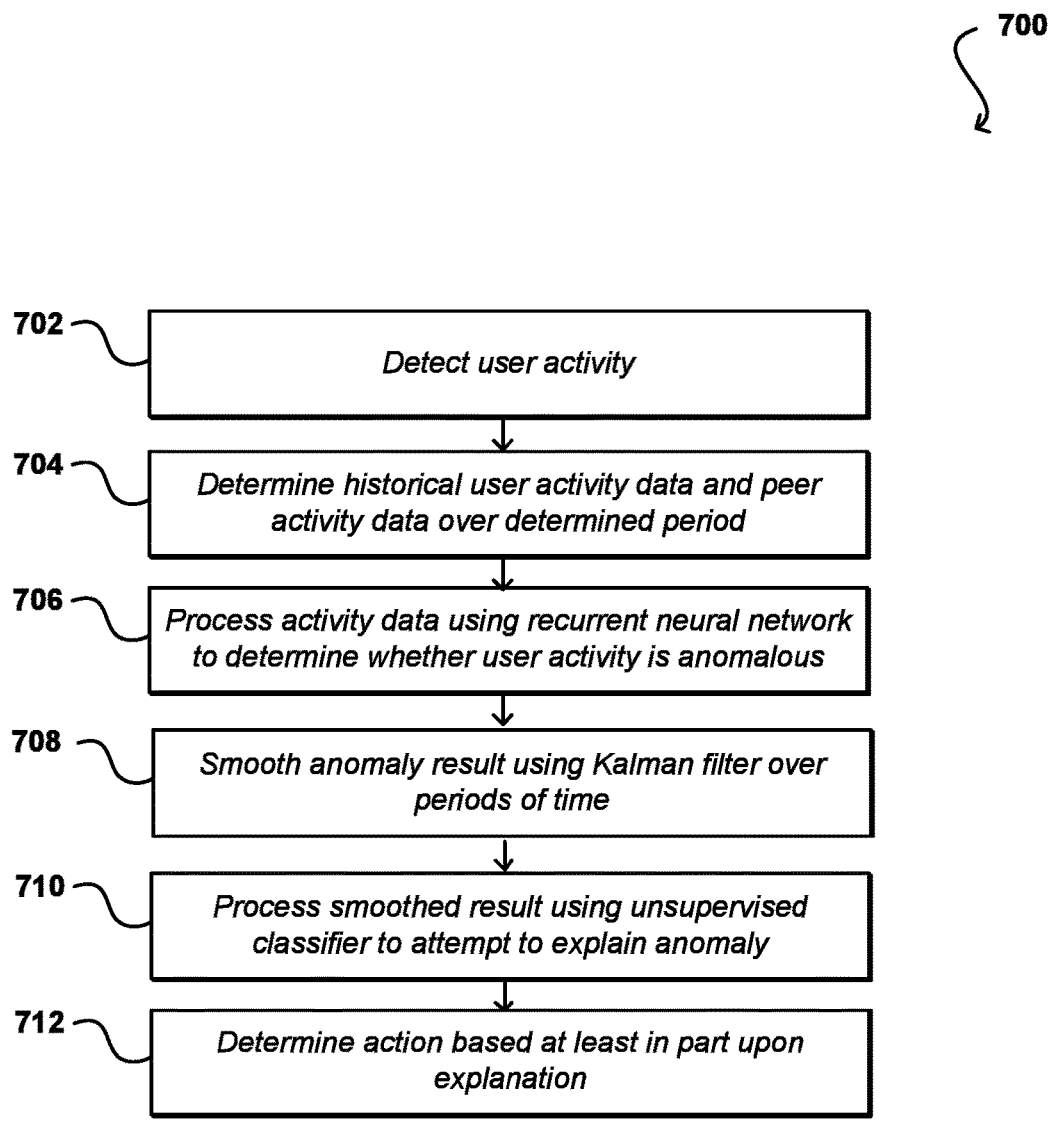
FIG. 7 illustrates an example process for determining whether detected behavior is anomalous that can be utilized in accordance with various embodiments.

FIG. 7 illustrates another example process 700 that can be used to process the access data as discussed with respect to FIG. 6. In this example, the user activity is detected 702 as part of the monitoring process discussed previously. In order to properly evaluate whether the activity is anomalous, both historical activity for the user and activity of the user's peer group, at least over a recent period of time, can be determined 704. The activity data can then be processed 706 using, for example, a recurrent neural network (or other neural network classifier) to determine whether the activity is anomalous, or otherwise deviates from the expected user and/or peer activity. The result of the RNN can be smoothed 708 in at least some embodiments using a Kalman filter that analyzes the data over multiple periods of time. This smoothed result can then be processed 710 using an unsupervised and/or semi-trained classifier to attempt to explain the anomaly. The classifier can attempt to statistically determine the reason for the anomaly and provide feedback that can be used to determine an extent of the anomaly, as well as to further train the classifier or RNN. An appropriate action can then be determined 712 based at least in part upon the provided explanation. As mentioned, actions can include generating alarms for a security team using a user interface, messaging service, or other such mechanism, among other such options.

Figure 8:
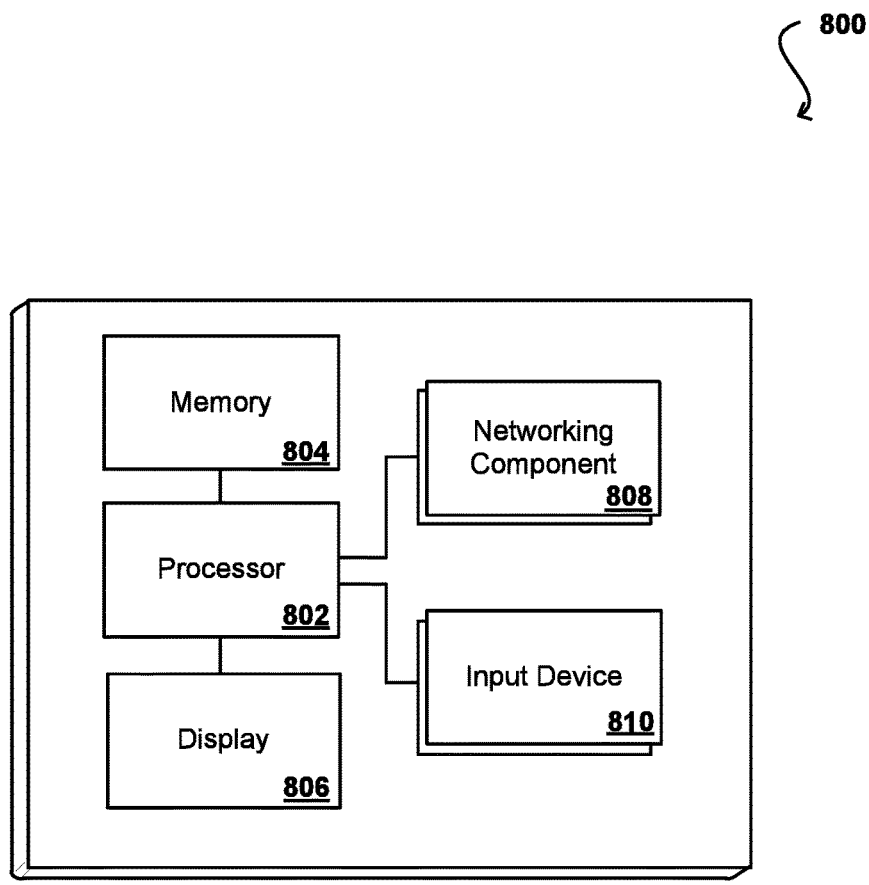
FIG. 8 illustrates example components of a computing device that can be used to implement aspects of the various embodiments.

FIG. 8 illustrates a set of basic components of an example computing device 700 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
training a topic model using a set of training documents, each training document of the set having at least one identified topic and an assigned risk score;
training a random forest regressor using the set of training documents;
crawling a plurality of documents, stored for an entity across an electronic resource environment, to index the plurality of documents;
determining, using at least the topic model, one or more topics for each document of the plurality of documents;
determining, using at least the random forest regressor, a risk score for each document of the plurality of documents;
training a recurrent neural network using historical activity with respect to the plurality of documents in the electronic resource environment;
determining, using the recurrent neural network, an expected activity of a specified user with respect to the plurality of documents over at least one determined period time;
detecting user activity with respect to at least a specified document of the plurality of documents, the user activity associated with the specified user;
processing the activity using the recurrent neural network to determine whether the user activity deviates from the expected type of activity, the determination further based at least in part upon at least one topic determined for the specified document; and
generating a security alert if the user activity is determined to deviate unacceptably from the expected activity and a risk score for at least one of the user activity or the specified document at least meets an alert threshold.

2. The computer-implemented method of claim 1, further comprising:
processing, using a Kalman filter, a result of the processing by the recurrent neural network to analyze the user activity over a plurality of periods of time to further determine whether the user activity deviates more than an allowable amount from the expected activity.

3. The computer-implemented method of claim 1, further comprising:
comparing the user activity further against peer activity for peers in a peer group including the specified user; and
determining whether the user activity deviates unacceptably from the expected activity based further upon a second deviation of the user activity with respect to the peer activity.

4. The computer-implemented method of claim 3, further comprising:
determining the peer group, including the specified user, using an unsupervised classifier trained using moni-tored activity data with respect to the plurality of documents and a plurality of users of the electronic resource environment.

5. A computer-implemented method, comprising:
training a neural network using historical activity with respect to a plurality of documents stored, on behalf of an entity, in an electronic resource environment;
determining, using the neural network, an expected activity of a specified user with respect to the plurality of documents over at least one determined period time;
detecting user activity, over at least a determined period of time, with respect to at least a specified document of the plurality of documents, the user activity associated with the specified user;
determining at least one topic associated with the specified document;
comparing the at least one topic against topics associated with the expected activity;
processing the user activity using the neural network to determine whether the user activity deviates from the expected type of activity, the determination based at least in part upon a topic distance, in a topic vector space, between the at least one topic and the topics associated with the expected activity; and
performing a determined action if the user activity is determined to deviate unacceptably from the expected type of activity.

6. The computer-implemented method of claim 5, further comprising:
determining the action to be performed based at least in part upon a determined risk score, at least one risk threshold associated with a possible action to be performed.

7. The computer-implemented method of claim 6, wherein the action is one of a plurality of possible actions each associated with a respective range of risk scores, the possible actions including at least one of generating a security alert, logging anomalous activity data, or adjusting access permissions associated with at least one of the specified user or the specified document.

8. The computer-implemented method of claim 5, further comprising:
processing, using a Kalman filter, a result of the processing by the neural network to analyze the user activity over a plurality of periods of time to further determine whether the user activity deviates unacceptably from the expected activity.

9. The computer-implemented method of claim 8, further comprising:
processing a result of the Kalman filter processing using a trained classifier to determine whether the user activity deviates unacceptably from the expected activity.

10. The computer-implemented method of claim 5, further comprising:
comparing the user activity further against peer activity for peers in a peer group including the specified user; and
determining whether the user activity deviates unacceptably from the expected user activity based at least in part upon a second deviation of the user activity with respect to the peer activity.

11. The computer-implemented method of claim 10, further comprising:
determining the peer group, including the specified user, using an unsupervised classifier trained using monitored activity data with respect to the plurality of documents and a plurality of users of the electronic resource environment.

12. The computer-implemented method of claim 5, wherein the user activity includes at least one of a type of access, a frequency of access, a total number of access attempts over a period of time, a source address for the access, a topic accessed, a type of document accessed, a location of the access, a day or time of the access, or an application programming interface (API) call used to obtain the access.

13. A system, comprising:
   at least one processor; and
   memory including instructions that, when executed by the at least one processor, cause the system to:
   train a topic model using a set of training documents, each training document of the set having at least one identified topic and an assigned risk score;
   crawl a plurality of documents, stored for an entity across an electronic resource environment, to locate and index the plurality of documents;
   determine, using at least the topic model, one or more topics for each document of the plurality of documents;
   determine a risk score for each document of the plurality of documents using a trained random forest regressor; and
   provide security information for access by an authorized user associated with the entity, the security information including information for the identified topics and risk scores for the plurality of documents stored for the entity.

14. The system of claim 13, wherein the instructions when executed further cause the system to:
   detect updated document data corresponding to at least one of new documents or document changes stored for the entity is the electronic resource environment; and
   further train the topic model for each instance of the updated document data.

15. The system of claim 13, wherein the instructions when executed further cause the system to:
   utilize natural language understanding (NLU) to analyze the plurality of documents to determine one or more topics associated with each document of the plurality of documents.

16. The system of claim 13, wherein the instructions when executed further cause the system to:
   determine a plurality of elements contained in the plurality of documents, each element of the plurality of elements posing a potential security risk to the entity;
   assign a respective risk score for each element of the plurality of elements; and
   determine the risk score for a specified document of the plurality of documents based at least in part upon a highest respective risk score for one of the elements associated with the specified document.

17. The system of claim 13, wherein the instructions when executed further cause the system to:
   detect a new document stored for the entity in the electronic resource environment;
   determine one or more topics associated with the new document;
   assign the new document to a document bucket associated with other documents having the one or more topics of the new document; and
   assign a risk score to the new document based at least in part upon a bucket risk score for the document bucket.

18. The system of claim 13, wherein the instructions when executed further cause the system to:
   cause new topics to be learned by processing the plurality of documents using the trained topic model.

19. The system of claim 13, wherein the instructions when executed further cause the system to:
   enable types of documents to be classified by the topic model that are specific to an industry of the entity and do not contain content previously associated with a topic.

* * * * *